(12) United States Patent
Rowland et al.

(10) Patent No.: US 7,483,959 B2
(45) Date of Patent: Jan. 27, 2009

(54) METHOD AND SYSTEM FOR EXTENSIBLE DATA GATHERING

(75) Inventors: Craig Rowland, Monroe, WA (US); Christopher L. Burgess, Redmond, WA (US); Dieter Achtelstetter, Seattle, WA (US); Adam Sandford, Seattle, WA (US); Shobana Balakrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 10/611,118

(22) Filed: Jun. 30, 2003

(65) Prior Publication Data

US 2004/0128381 A1 Jul. 1, 2004

Related U.S. Application Data

(60) Provisional application No. 60/434,996, filed on Dec. 19, 2002.

(51) Int. Cl.
*G06F 15/16* (2006.01)
*G06F 15/173* (2006.01)

(52) U.S. Cl. ................... 709/217; 709/223; 709/224
(58) Field of Classification Search .......... 709/217
See application file for complete search history.

(56) References Cited

U.S. PATENT DOCUMENTS

| | | | | |
|---|---|---|---|---|
| 5,583,976 A | * | 12/1996 | Bullard, Jr. ............... | 345/440 |
| 5,754,831 A | * | 5/1998 | Berman .................... | 703/13 |
| 5,982,390 A | * | 11/1999 | Stoneking et al. ......... | 345/474 |
| 6,044,155 A | * | 3/2000 | Thomlinson et al. ....... | 713/155 |
| 6,289,382 B1 | * | 9/2001 | Bowman-Amuah ........ | 709/226 |
| 6,295,527 B1 | * | 9/2001 | McCormack et al. ....... | 707/3 |
| 6,332,163 B1 | * | 12/2001 | Bowman-Amuah ........ | 709/231 |
| 6,389,535 B1 | * | 5/2002 | Thomlinson et al. ....... | 713/165 |
| 6,516,345 B1 | * | 2/2003 | Kracht .................... | 709/220 |
| 7,031,895 B1 | * | 4/2006 | Takahashi et al. ......... | 703/13 |
| 7,346,675 B2 | * | 3/2008 | Givoly et al. ............. | 709/223 |
| 7,356,533 B1 | * | 4/2008 | Schneiter et al. .......... | 707/10 |
| 7,412,510 B2 | * | 8/2008 | Schweitzer et al. ........ | 709/224 |
| 2003/0028670 A1 | * | 2/2003 | Lee et al. ................. | 709/241 |
| 2003/0043820 A1 | * | 3/2003 | Goringe et al. ........... | 370/400 |
| 2003/0046390 A1 | * | 3/2003 | Ball et al. ................ | 709/224 |

(Continued)

OTHER PUBLICATIONS

Liu, Q. et al., "Digital Rights Management for Content Distribution", *Conferences in Research and Practice in Information Technology Series, proceedings of the Australasian Informaiton Security Workshop Conference on ACSW Frontiers*, 2003, 21, 49-58.

*Primary Examiner*—George C Neurauter, Jr.
*Assistant Examiner*—Daniel C Murray
(74) *Attorney, Agent, or Firm*—Woodcock Washburn LLP

(57) ABSTRACT

Extensible device data gathering is performed by a server in concert with at least one gatherer. The server accepts requests from clients and dispatches a gatherer to gather device data from devices on a network. When the data is returned, the server stores the data in a repository. The server also handles requests for repository data from clients. A gatherer presents an interface to the server which the server can use to dispatch the gatherer. The system is extensible because new gatherers may be created and may register with the server without any changes to the server. In one embodiment, this extensibility is achieved using the COM (Component Object Model) technology.

27 Claims, 4 Drawing Sheets

U.S. PATENT DOCUMENTS

2004/0210630 A1* 10/2004 Simonnet et al. ............ 709/203
2007/0294593 A1* 12/2007 Haller et al. .................. 714/45
2008/0059346 A1* 3/2008 Schweitzer et al. ........... 705/30

* cited by examiner

METHOD AND SYSTEM FOR EXTENSIBLE DATA GATHERING

CROSS-REFERENCE TO RELATED APPLICATIONS

This application claims the benefit of U.S. Provisional Application No. 60/434,996, filed Dec. 19, 2002 and entitled "Methods and Systems for Generating Component Level Hardware Inventory."

FIELD OF THE INVENTION

This invention relates to the management of networked devices. More particularly, this invention relates to the gathering of data from devices on a network.

BACKGROUND OF THE INVENTION

Large networks of computer devices are often utilized in organizations. For example, an installation in which each individual user has a device and these user devices are connected to a network is common. In such an installation, it may be useful to be able to identify each device consistently over time. One way to provide consistent identification is to use a device identity that is based on gathered information regarding the hardware components of the device and other device information.

Additionally, in a network, it may be useful to maintain information regarding the devices on a network. For example, in a software development context, it may be necessary to test a piece of software under development in different hardware contexts. One way to do this is to request that users report on their devices. However, relying on users to respond to requests to provide hardware parameters of a device may not yield the necessary results. Additionally user reporting may be unreliable, so relying on users to report on their devices may not be sufficient to provide complete and accurate information regarding their devices. Information may be incomplete and inaccurate, and the ability to target a test at a specific set of devices or the ability to target a test at a specific hardware component (regardless of the device in which the component is installed) will be impeded.

To the extent that systems which gather device data in a network exist, these device data gatherers gather only specified data, and are not extensible. Thus, an additional need is to minimize duplicated effort in the development and implementation of a new gatherer to gather information when new information is being gathered from the devices.

SUMMARY OF THE INVENTION

Extensible device data gathering systems and methods are presented. In one embodiment, a repository, a server, and at least one gatherer are provided. The repository stores device data collected from devices on a network. The server manages the repository and manages requests from clients for the collection of specific data from devices on the network. The server includes an interface by which such requests can be made. The server also includes an interface by which requests for the data in the repository can be made.

The gatherer gathers specific information from the devices upon a call to a gatherer interface. New gatherers may be implemented without changing the server. Information regarding the gatherer is registered with the server. The server can then call the gatherer to service requests from clients.

Other aspects of the present invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
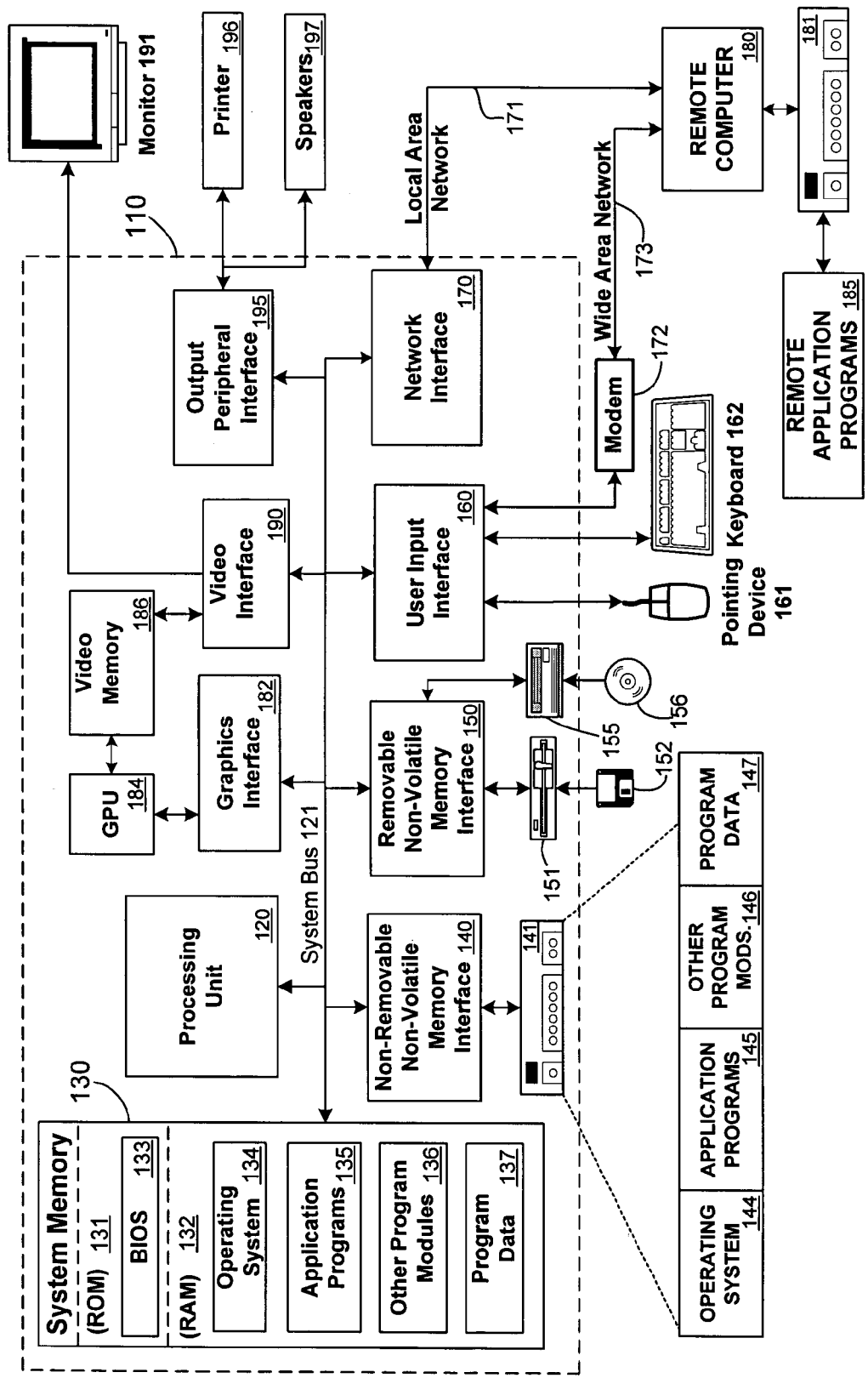
FIG. 1 is a block diagram of an example computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer may also include Graphics Interface 182, GPU 184, Video Memory 186 and Output Peripheral Interface 195.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Device Data Inventory

Figure 2:
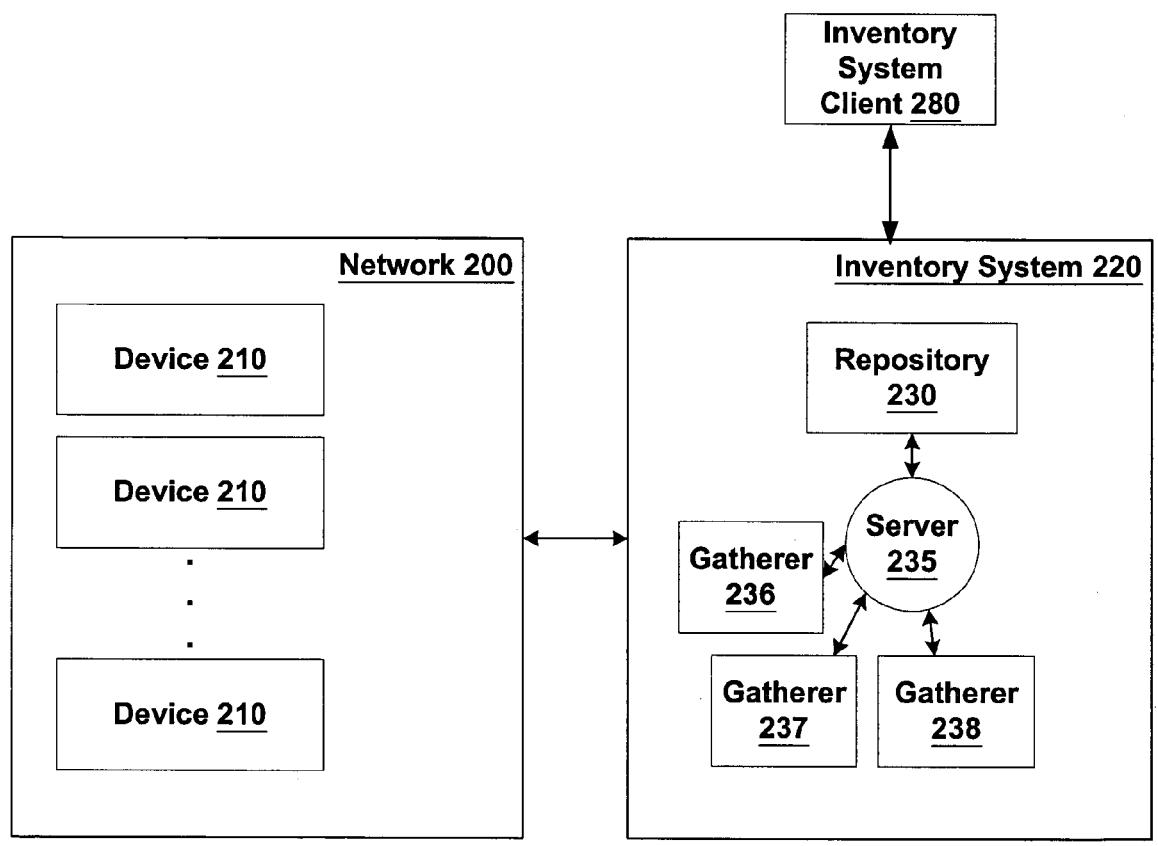
FIG. 2 is a block diagram of a network and an inventory system according to one embodiment of the invention.

A device data inventory is created for devices on a network. FIG. 2 is a block diagram of a network and an inventory system according to one embodiment of the invention. As shown in FIG. 2, in one embodiment, a network 200 consists of devices 210. An inventory system 220 containing a repository 230 is in or connected to network 200 in such a way as to enable communication between the inventory system 220 and devices 210. In order to identify one of devices 210, information from that device 210 is received by inventory system 220. The information in repository 230 is consulted. If a matching record for that device 210 is found in the repository 230, the data in repository 230 is updated, if necessary, so that the repository 230 contains the most current information regarding that device 210. If a matching record for that device 210 is not found in repository 230, a new record for that device 210 is added to repository 230. In other embodiments, other device identification methods are used.

Inventory system 220 contains a server 235 which creates and manages data in the repository 230. Repository 230 can be used, for example, to identify devices 210 in order to target a test at a specific set of devices 210 or to target a test at a specific hardware component of a device 210, regardless of the device 210 that component is installed in.

Additionally, repository 230 can be used to provide a snapshot of the configuration of one or more devices 210 in the network 200. This snapshot is included with test results for use in interpreting those test results. The repository 230 is also used to tie together hardware information about a device 210, test logs about tests, and test run data about individual tests together, based on a machine identity for the device 210. In addition, repository 230 can be used as a global inventory for the devices 210 on network 200. Searches and queries to the repository 230 are supported.

In one embodiment, in repository 230, each device 210 is identified by a unique device identity which is created using hardware component information. Some hardware component information which may be used includes: information from SMBIOS (System Management Basic Input/Output System) data stored in the device; the serial number of the boot hard disk drive in the device 210 (a serial number put by the manufacturer into the ROM of a hard disk drive such as hard disk drive 141 in FIG. 1); the MAC (media access control) address of a first or second Ethernet card on the device 210; the machine name stored on the device 210; the physical size of the RAM on the device 210; the RAM clock speed of the device 210; data regarding the accelerated graphics port (AGP) memory in the device 210; the vendor ID of the boot hard disk drive of the device 210; or the product ID of the boot hard disk drive of the device 210. In other embodiments, other device identifications are used.

Inventory System Components: Server

As previously discussed, the inventory system includes a server 235. This server is implemented as a process with interfaces to other processes, known as client processes. In one embodiment, the server is an out-of-process COM (component object model) server. Such an out-of-process COM server conforms to a model which defines how objects interact within a single process or between processes.

Server 235 controls access to repository 230. Through server 235, clients (including data gatherers) can write to repository 230. Additionally, clients can search and retrieve information from repository 230. For example, if a testing program wished to find all devices 210 with a given value for certain data stored with regard to the device 210's hardware, the testing program would do so by consulting server 235. Additionally, server 235 allows clients to request that repository 230 be persisted so that no data is lost.

Interfaces (also known as entry points) are provided in server 235. These interfaces are used by gatherer components (discussed below) in order to access the functionality of server 235. Clients of the inventory system 220, such as inventory system client 280 also communicate with the inventory system 220 through such interfaces as well. A first interface allows inventory system client 280 to add data to repository 230. A second interface allows inventory system client 280 to request that repository 230 be searched and data retrieved. In one embodiment, a third interface persists data from repository 230. If repository 230 is implemented as in-process memory, persisting the data is useful so that the data in the repository 230 is not lost. The data may be persisted in any of several formats, depending on what is supported by server 235 and on the request from inventory system client 280.

Inventory System Components: Gatherers

With reference again to FIG. 2, the data with regard to devices 210 is collected by gatherers 236, 237, and 238. Each gatherer, for example gatherer 236 may be constructed to gather a specific set of information from devices 210. For example, gatherer 236 may gather information about specific hardware components on a device 210. A gatherer may also gather non-hardware information, such as applications installed on a device 210, applications deployed on startup, which Internet domains have been most recently used, and the like.

In one embodiment, each gatherer is implemented as a COM component which communicates with the server 235, implemented as an out-of-process COM gatherer through COM interface techniques. In this way, two gatherers can communicate with the same instance of server 235. If server 235 is implemented in-process, this benefit would not accrue, as each client must use a separate instance of a server 235.

In one embodiment, server 235 includes some gathering functionality. In this embodiment, some data is gathered by server 235 from the devices 210. This may occur in addition to separate gatherers such as 236, 237 and 238.

Because each gatherer accesses the server 235 through an exposed interface of server 235, if a new gatherer is required, server 235 does not need to be recompiled. This allows the extensibility of the functionality of the inventory system 220, with new data collected. Because server 235 does not need to be recompiled, an uncompiled version of server 235 does not need to be provided to the writer of a new gatherer. This provides increased security while still allowing flexibility in gathering information from devices.

Figure 3:
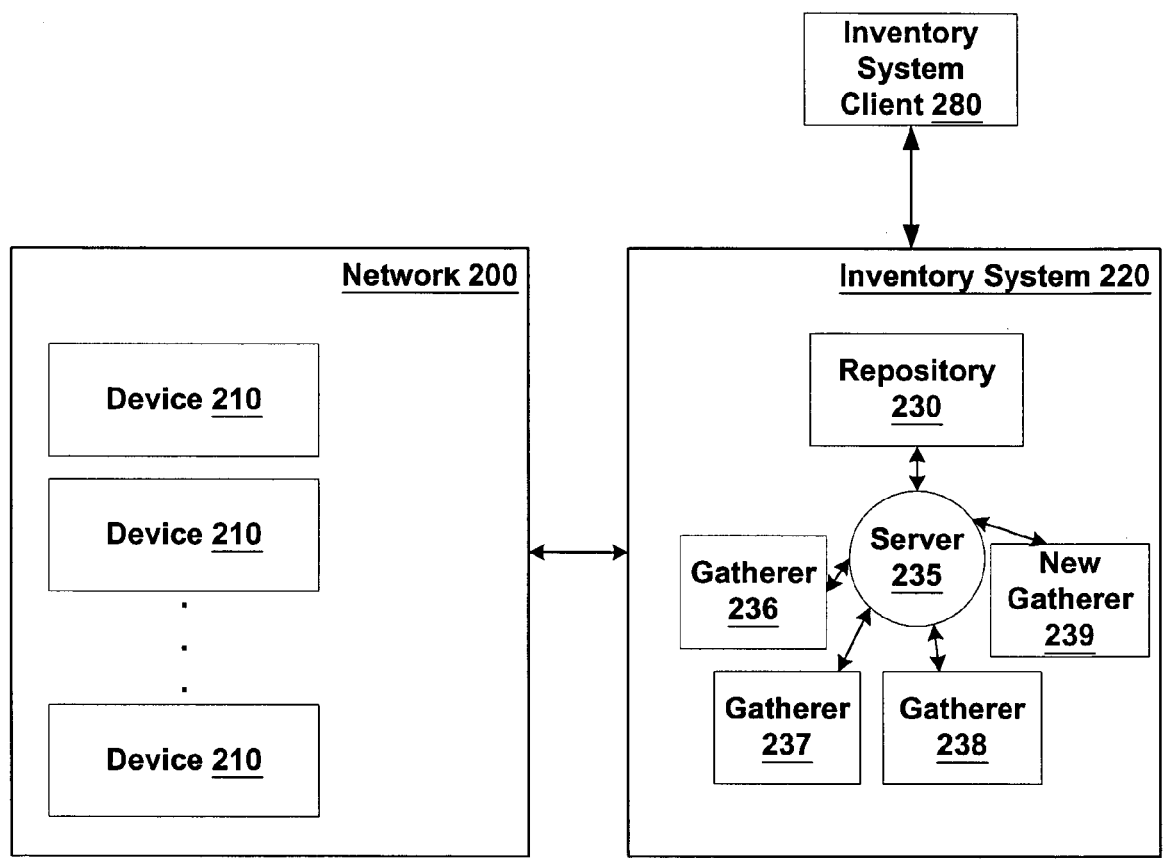
FIG. 3 is a block diagram of a network and an inventory system with a new gatherer according to one embodiment of the invention.

FIG. 3 is a block diagram of a network and an inventory system with a new gatherer 239 implemented. Server 235 does not need to be changed. The interfaces provided in server 235 which gatherers 236, 237, 238 use can also be used by new gatherer 239.

Adding a New Gatherer to the Inventory System 220

Figure 4:
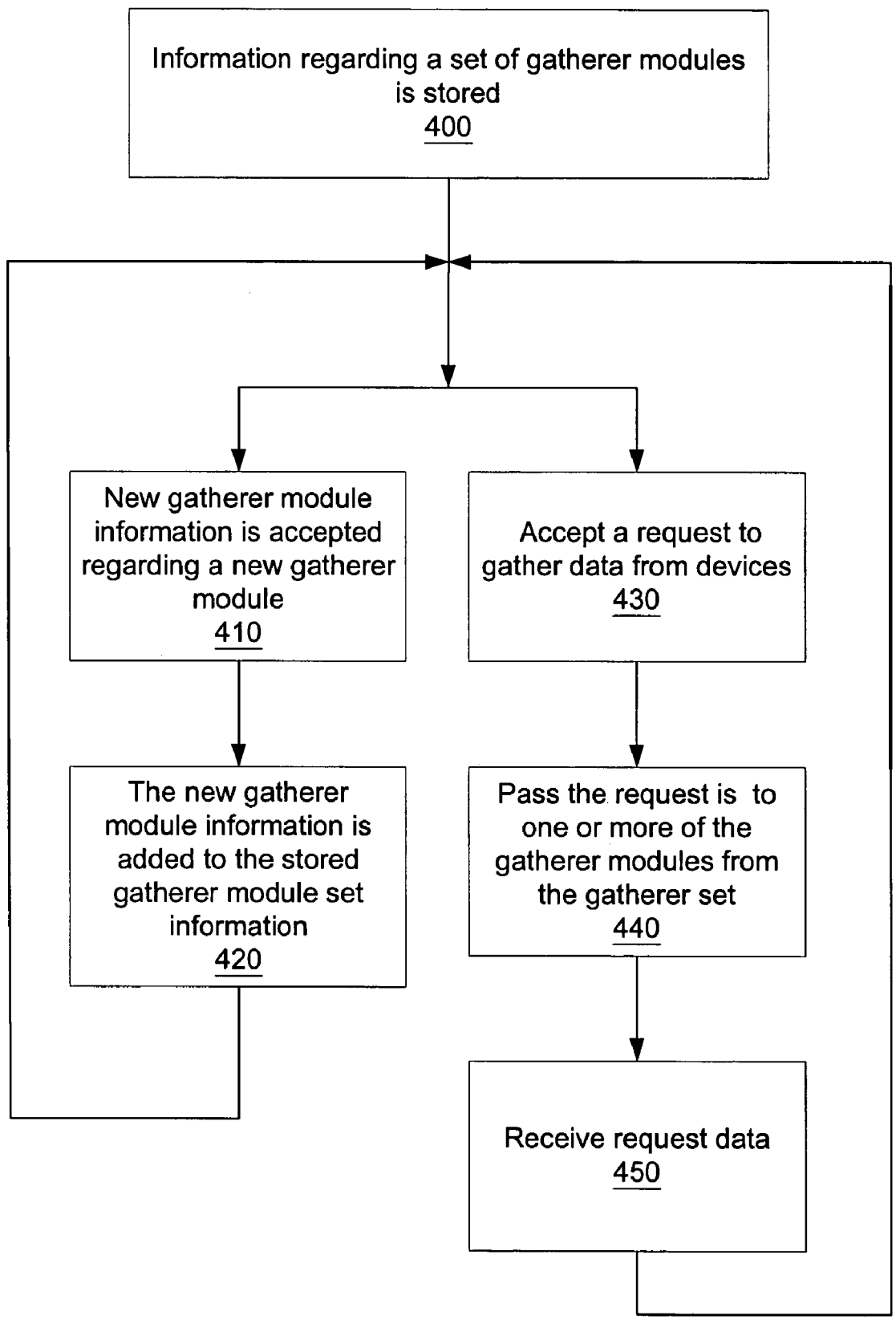
FIG. 4 is a flow diagram of a method for implementing extensible device data gathering.

FIG. 4 is a flow diagram illustrating the extensible device data gathering method according to one embodiment. Information regarding a set of gatherer modules is stored in step 400. With reference to the example in FIG. 2, the gatherer module set corresponds to gatherer 236, 237, and 238. Each gatherer module accepts a request to gather data from devices 210 and gathers data according to the request. Again with reference to FIG. 4, new gatherer module information is accepted regarding a new gatherer module in step 410. With reference to the example in FIG. 3, the new gatherer module corresponds to new gatherer 239. Again with reference to FIG. 4, the new gatherer module information is added to the stored gatherer module set information (from step 400) in step 420.

In addition, a request to gather data from devices 210 is accepted in step 430. In step 440, the request is passed to one or more of the gatherer modules from the gatherer set (with reference to the example in FIG. 3, one of gatherers 236, 237, 238, and 239). A request may be passed to more than one of the gatherers at once, and the gatherers may gather data from more than one device 210 simultaneously. When the data is returned, the requested data is received in step 450. The data is then either stored in repository 230 or returned to the requesting inventory system client 280.

Implementing Gatherers

In one embodiment, in order to implement a new gatherer 239, a header file for new gatherer 239 is created which provides the gatherer's entry point function definition and the name of the gatherer. The naming convention for the header file may for example be <gatherer name>_gatherer.h. For example, for a gatherer which gathers information regarding the processor of a device 210, the header file might be named processor_gatherer.h. When a new header file is created for new gatherer 239, the new header file is then added to a file named all_gatherers.h which includes each of the header files for gatherers.

A public function is created for new gatherer 239 so that new gatherer 239 can be called in order to gather information from devices 230. Parameters to the function include a first parameter which describes where the gathered data should be stored and a second parameter which describes which data should be gathered. A filter structure may also be included to tell the gatherer to only gather certain information. Information regarding the public function is also placed into the header file.

When the public function is run, the new gatherer 239 gathers data from one or more of the devices 210. When the data has been gathered, the interfaces to the server 235 are called in order to store the gathered data in the repository 230.

In another embodiment, new gather 239 is implemented as a COM component. In this case, the COM structure in which server 235 is running will be used to communicate between the gatherer 239 and inventory system client 280 calling the gatherer. In this case, new gatherer 239 needs to register itself into a COM category established for COM gatherers. Two interface functions are implemented in new gatherer 239 so server 235 can accept data from new gatherer 239. One, GetGathererName returns new gatherer 239's name.

The second interface function, GetGathererData, is called by the server 235 when inventory system client 280 wishes to gather the information that new gatherer 239 gathers. This interface function takes as an argument a class containing all of the APIs needed to add data to the data store. In this way, the server 235 can get the name of new gatherer 239 and can provide to new gatherer 239 the information needed by new gatherer 239 to use the interfaces of server 235. Another argument consists of flags which describe to new gatherer 239 what data to get. For example, one flag might indicate a privacy mode, and what that flag is set, the new gatherer 239 does not gather information which might be considered sensitive from devices 210. Another set of flags might indicate how much data to get—for example, flags for "short" "normal" or "long" data gathering might signal how much of the gathered data should be stored in repository 230. Generally, gatherer-specific data may be included in a call to GetGathererData by inventory system client 280 via the server 235.

In one embodiment, in repository 230, the data from a gatherer is stored as tree nodes hanging off a gatherer root node. The root nodes are linked as a doubly linked list traversal of all gatherer sub-trees. These tree nodes are called binary nodes that contain data in a format dictated by the gatherer. The data residing in a node can be any C/C++ structure as long as it does not have a level of indirection within. The structure should also be flat since nested structures are stored via the sibling child nodes in the tree. A text node can hang from a binary node, and is used to store textual information pertaining to the data in the binary node. Each text node is a 3-tuple comprising of (name, display name, value). The binary node data and text node data is saved to a binary file and the text node data can be saved to an xml file.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for extensible device data gathering in a network having one or more devices and one or more clients, comprising:

storing gatherer module set information regarding at least one existing gatherer module, each said existing gatherer module capable of accepting a request to gather data from at least one of said devices and gathering data according to said request;

storing a unique identifier for each of the devices in the network in a repository;

receiving new gatherer module information regarding a new gatherer module;

adding said new gatherer module information to said stored gatherer module set information;

receiving a request to gather device data;
determining at least one selected gatherer module using the gatherer module set information;
requesting said data from the at least one selected gatherer module by calling an interface function of the selected gatherer module with a parameter specifying a class of APIs Application Programming Interface needed to add data to the repository and at least one flag indicating data to be acquired by the selected gatherer module; and
receiving said data from said at least one selected gatherer module, wherein the data is received by the selected gatherer module using at least one of the APIs provided to the selected gatherer in the interface function.

2. The method of claim 1,
wherein the data is stored in a repository via one of the APIs.

3. The method of claim 2, wherein said method further comprises:
accepting a request for data from said repository; and
responding to said request for data with data from said repository.

4. The method of claim 2, wherein said method further comprises:
accepting a request to persist data from said repository; and
persisting data from said repository.

5. The method of claim 1, wherein said accepting a request to gather device data comprises:
exposing a device data gathering request interface; and
accepting requests received via said data gathering request interface.

6. The method of claim 5, wherein said exposing a device data gathering interface comprises a COM interface.

7. The method of claim 1, wherein said accepting a new gather module information comprises:
exposing a new gatherer module information interface; and
accepting new gatherer module information via said new gatherer module information interface.

8. The method of claim 7, wherein said exposing a new gatherer module information interface comprises exposing a COM interface.

9. The method of claim 1 wherein each of said gatherer modules is a COM component and wherein accepting new gatherer module information regarding a new gatherer module information comprises accepting information via a COM interface.

10. A system for extensible device data gathering in a network having one or more devices, comprising:
a repository for storing device data, wherein the repository stores a unique device identifier for each device in the repository;
at least one gatherer module, wherein each gatherer module upon a request, performs a specific device gathering function for a device, wherein each gatherer module is implemented using a component-based software model;
a server, wherein the server is implemented as an out-of-process component using the component-based software model and comprises a plurality of interfaces, each interface corresponding to a functionality of the server, wherein the server further comprises:
gatherer module set storage for gatherer module set information regarding at least one existing gatherer module;
new gatherer module acceptance logic for accepting new gatherer module information regarding a new gatherer module;
gatherer module set storage adding logic for adding said new gatherer module information to said stored gatherer module set information in said gatherer module set storage;
device data request acceptance logic for accepting a request to gather device data;
gatherer request logic for requesting said data from at least one selected gatherer module; and
gatherer data receipt logic for receiving said data from said at least one selected gatherer module.

11. The system of claim 10, wherein said system further comprises:
repository request logic for accepting a request for data from said repository; and
repository request response logic for responding to said request for data with data from said repository.

12. The system of claim 11, wherein repository request logic comprises:
a device data gathering request interface.

13. The system of claim 12, wherein said a device data gathering request interface comprises a COM interface.

14. The system of claim 10, wherein said system further comprises:
persist request logic for accepting a request to persist data from said repository; and
persist logic for persisting data from said repository.

15. The system of claim 10, wherein new gatherer module acceptance logic comprises:
a new gatherer module information interface.

16. The system of claim 15, wherein said a new gatherer module information interface comprises a COM interface.

17. The system of claim 10 wherein each of said gatherer modules is a COM component and where said new gatherer module acceptance logic comprises a COM interface.

18. A computer-readable medium for extensible device data gathering in a network having one or more devices, said computer-readable medium having instructions to perform acts comprising:
executing a server as an out-of-process component using a component-based software model;
storing existing gatherer module set information regarding at least one existing gatherer module, each of said gatherer modules capable of accepting a request to gather data from at least one of said devices and gathering data according to said request, wherein each gatherer is implemented using a component-based software model;
accepting new gatherer module information regarding a new gatherer module;
adding said new gatherer module information to said stored gatherer module set information;
accepting a request to gather device data;
requesting said data from at least one selected gatherer module; and
receiving said data from said at least one selected gatherer module.

19. The computer-readable medium of claim 18, wherein said acts further comprise:
storing said received data in a repository.

20. The computer-readable medium of claim 19, wherein said acts further comprise:
accepting a request for data from said repository; and
responding to said request for data with data from said repository.

21. The computer-readable medium of claim 19, wherein said acts further comprise:
accepting a request to persist data from said repository; and
persisting data from said repository.

22. The computer-readable medium of claim 18, wherein said accepting a request to gather device data comprises:
exposing a device data gathering request interface; and
accepting requests received via said data gathering request interface.

23. The computer-readable medium of claim 22, wherein said exposing a device data gathering interface comprises exposing a COM interface.

24. The computer-readable medium of claim 18, wherein said accepting new gatherer module information comprises:
exposing a new gatherer module information interface; and
accepting new gatherer module information via said new gatherer module information interface.

25. The computer-readable medium of claim 24, wherein said exposing a new gatherer module information interface comprises exposing a COM interface.

26. The computer-readable medium of claim 18 wherein each of said gatherer modules is a COM component and where said act of accepting new gatherer module information regarding a new gatherer module comprises accepting information via a COM interface.

27. A system for extensible device data gathering in a network having one or more devices, comprising:
a repository for storing device data, wherein the repository stores a unique device identifier for each device in the repository;
at least one gatherer module, wherein each gatherer module upon a request, performs a specific device gathering function for a device, wherein each gatherer module is implemented using a component-based software model;
a server, wherein the server is implemented as an out-of-process component using the component-based software model and comprises a plurality of interfaces, each interface corresponding to a functionality of the server, wherein the server further comprises:
gatherer module set storage means for gatherer module set information regarding at least one existing gatherer module, each of said existing gatherer module capable of accepting a request to gather data from at least one of said devices and gathering data according to said request;
new gatherer module acceptance means for accepting new gatherer module information regarding a new gatherer module;
gatherer module set storage adding means for adding said new gatherer module information to said stored gatherer module set information in said gatherer module set storage means;
device data request acceptance means for accepting a request to gather device data;
gatherer request means for requesting said data from at least one selected gatherer module; and
gatherer data receipt means for receiving said data from said at least one selected gatherer module.

* * * * *